US 6,584,428 B1

(12) United States Patent
Irle et al.

(10) Patent No.: US 6,584,428 B1
(45) Date of Patent: Jun. 24, 2003

(54) POSITION SENSOR FOR A MOTOR VEHICLE

(75) Inventors: Henning Irle, Lippstadt (DE); Norbert Kost, Geseke (DE); Franz-Josef Schmidt, Salzkotten (DE)

(73) Assignee: Hella KG Hueck & Co., Lippstadt (DE)

( * ) Notice: Subject to any disclaimer, the term of this patent is extended or adjusted under 35 U.S.C. 154(b) by 56 days.

(21) Appl. No.: 09/594,126

(22) Filed: Jun. 14, 2000

(30) Foreign Application Priority Data

Jun. 15, 1999 (DE) .......................... 199 27 146

(51) Int. Cl.$^7$ ............................................. G06F 15/00
(52) U.S. Cl. ...................... 702/151; 702/94; 702/95; 702/97; 702/150; 73/118.1
(58) Field of Search .................. 73/118.1, 1.79, 73/1.81; 324/207.11, 207.12, 207.17, 207.24, 207.25, 226; 318/652, 653, 665, 661; 340/438, 686.11, 686.3, 686.6; 702/150, 151, 97, 94, 95

(56) References Cited

U.S. PATENT DOCUMENTS

| 4,915,075 | A | | 4/1990 | Brown |
| 5,138,873 | A | * | 8/1992 | Amano ....................... 73/118.1 |
| 5,681,990 | A | | 10/1997 | Hampo et al. |
| 6,304,076 | B1 | * | 10/2001 | Madni et al. ................ 318/660 |
| 6,467,338 | B1 | * | 10/2002 | Irle et al. .................... 73/118.1 |

* cited by examiner

Primary Examiner—Kamini Shah
Assistant Examiner—Stephen Cherry
(74) Attorney, Agent, or Firm—Birch, Stewart, Kolasch & Birch, LLP

(57) ABSTRACT

A position sensor for motor vehicle is described that generates a varying pulse-width-modulated, position-dependent signal as a sensor signal, wherein an overall measuring range of the position sensor is divided into several similar, sequential measuring ranges. The position sensor according to the invention makes it possible to transfer sensor alignment to a receiver(s), so that alignment in or on the position sensor can be inexpensively replaced, without negatively influencing the resolution of the position sensor.

3 Claims, 2 Drawing Sheets

POSITION SENSOR FOR A MOTOR VEHICLE

BACKGROUND OF THE INVENTION

This application claims priority based on German patent application 199 27 146.1, filed Jun. 15, 1999.

FIELD OF THE INVENTION

This invention relates to a position sensor for a motor vehicle, which generates, as a sensor signal, a pulse-width-modulated signal that varies as a function of position.

RELATED ART

It is currently common practice to adjust position sensors during production or after installation of the sensors. However, mechanical adjustment of these sensors is very costly for automobile manufacturers. Therefore, for sensors installed in vehicles, it is preferable to align, calibrate, or tune, such sensors using electrical alignment techniques. This alignment could be performed within a receiver of a sensor signal and could be initiated, for example, via an existing diagnostic-interface.

However, when using electrical alignment, a reduction in an original signal range of the position sensor may occur, which leads to an undesirable reduction in a signal resolution of the sensor.

It is an object of the invention is to provide a position sensor which makes possible shifting sensor alignment into a receiver(s) to cost-effectively replace an alignment in or on the position sensor, while not negatively influencing the signal resolution ability of the position sensor.

SUMMARY OF THE INVENTION

This object and other objects of the present invention are achieved by having a position sensor for a motor vehicle, which generates a varying pulse-width-modulated, position-dependent sensor signal, with an overall measuring range of the position sensor being divided into several equal, sequential measuring ranges. The position sensor adds a fixed offset value to a digitized measurement value, with a sum of a minimum measurement value and the fixed offset value corresponding to a pulse-width-modulated signal having a minimal degree of modulation greater than 0%, and a sum of a maximum measurement value and the fixed offset value corresponding to a pulse-width-modulated signal having a maximum degree of modulation being less than 100%. Further, a sensor measurement value determined under standard conditions is stored in a nonvolatile storage of a receiver of the position sensor, as an additional offset value.

DETAILED DESCRIPTION OF THE PREFERRED EMBODIMENT

Figure 1:
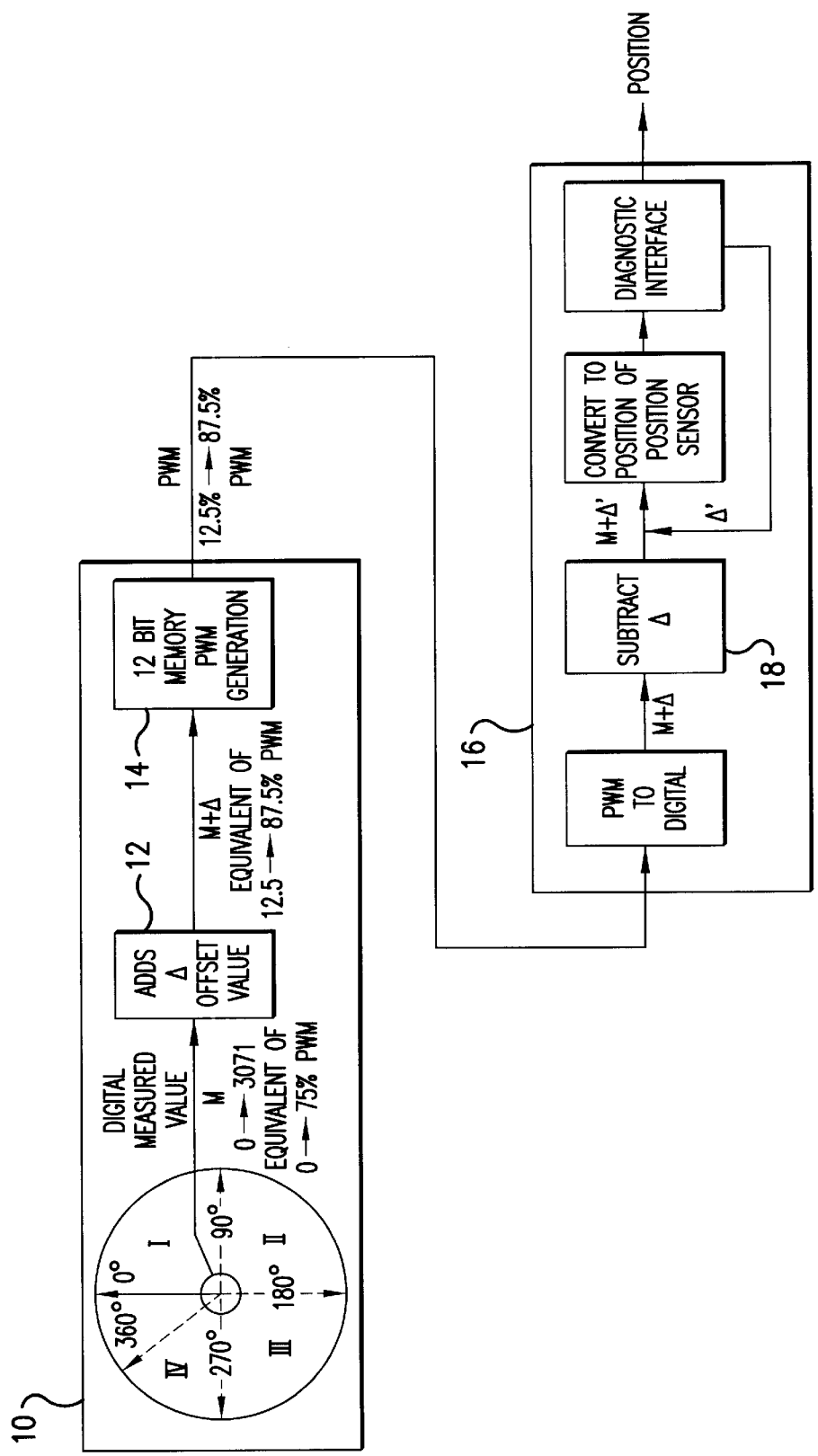
FIG. 1 is a block diagram of one embodiment of the invention.
Figure 2:
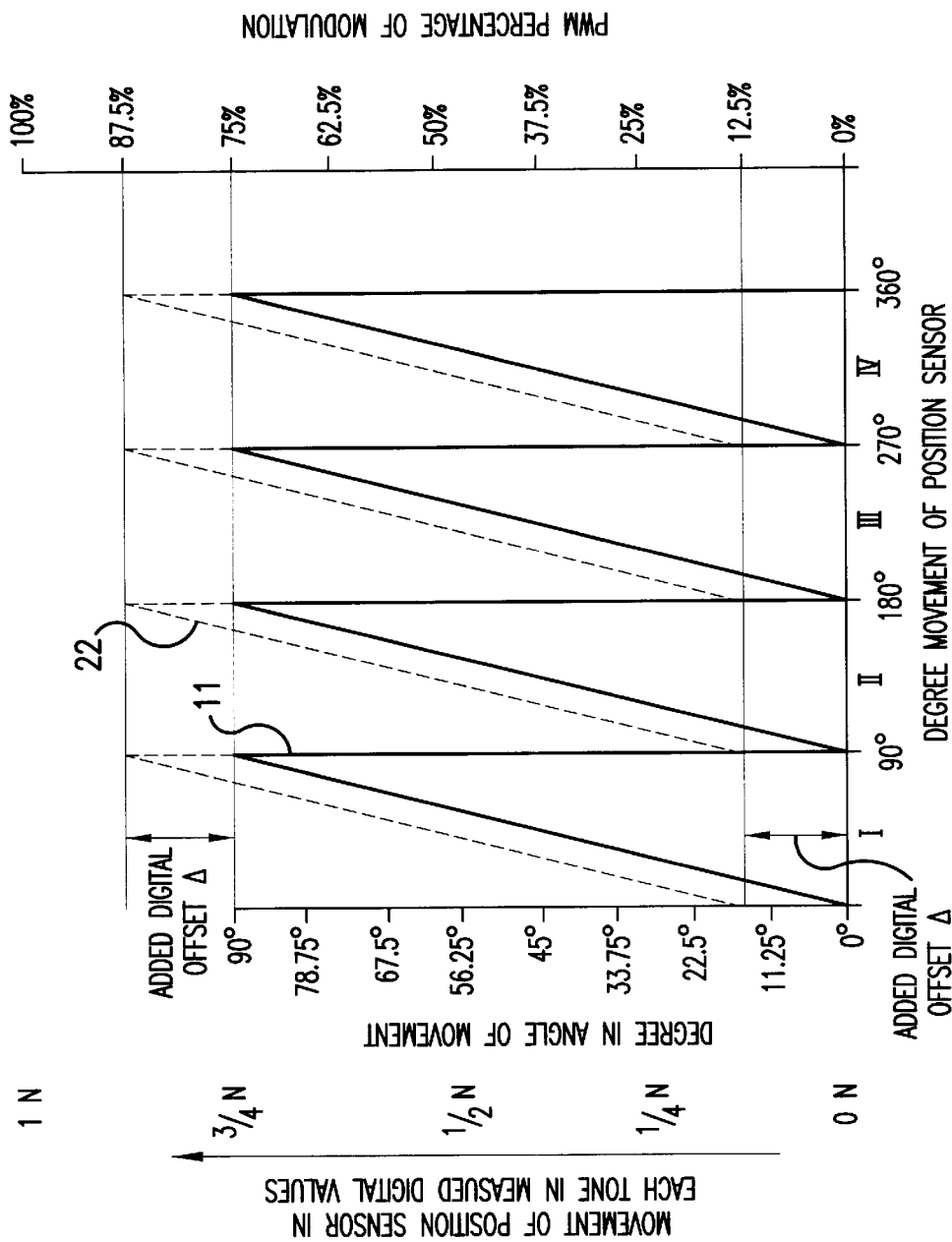
FIG. 2 is a chart illustrating operation of the device of FIG. 1.

To essentially eliminate degradation of a signal resolution of a position sensor, and to provide the broadest possible adjustment range for the sensor (that is, up to 360°), a position sensor 10 of the present invention generates a periodic measuring signal over a mechanical activation signal path; for example, given an angle of rotation of 360°, a periodic measuring signal is generated that repeats every 90°. This measuring signal is a pulse-width-modulated signal (PWM signal). Accordingly, for a signal that repeats every 90° over the angle of rotation of 360°, the resulting waveform is a saw tooth signal II, which undergoes four cycles I, II, III, IV over the rotation of 360°. Moreover, a transition at a trailing or a leading edge upon exceeding or going below a region of each cycle, takes place seamlessly.

To obtain a clean PWM signal transmission, a PWM signal value should not be modulated from 0 to 100%. This is understandable, because direct current levels of 0% or 100% cannot be differentiated. Therefore, it is preferable to modulate the PWM value between 10% and 90% of its value.

Therefore, in order to make it possible to have an uninterrupted changeover from one measuring range to a next, a fixed offset value $\Delta$ is added to an actual measured value M at 12 prior to performing PWM signal conversion at 14 to produce digital signal 22. Accordingly, for example, a measured value at 0% corresponds to the PWM minimal value (which is an offset of 12.5%). Further, a maximum PWM signal value is set such that the offset plus the measured value, for example, only reaches 87.5% of the possible PWM value.

A PWM signal ratio is then determined and evaluated in a receiver 16 of the position sensor system. This process, specifically, involves adjustment of the PWM signal value by removing the offset value $\Delta$ of $1/8=12.5\%$ at 18, which was added in the process discussed hereinabove. Therefore, the result, in a cleaned form, is in an original value region. Noise impulses shorter than 12.5% of PWM signal can be clearly recognized and filtered out.

The sensor of the present invention has several uninterrupted repeating measuring ranges across an entire signal range without gaps, ensuring an error-free transition from one measuring range to the next.

Additionally, with a position sensor according to the invention, it is now possible to determine the measuring range that is actually used for a specific application, after the sensor has been installed in a vehicle. Alignment, adjustment, or calibration in the position sensor itself can be omitted. Instead, the alignment of the measuring range is performed in the receiver and is initiated, or carried out, for example, via a diagnostic interface 20 coupled to the receiver. Under predetermined standard conditions, an additional offset value $\Delta'$ is added to the actual measured value and is stored as a reference value in an EEPROM.

Using the process of the present invention, if an angle sensor does not have a mechanical stop device, the actual position of the angle sensor rotor may be any position over a 360° turning range. Therefore, from an alignment, or calibration point, a range to be established (for example ±50%, or also −20 to +80%) of a selected measuring range is clear-cut. To ensure error free operation during normal operation, the signal must fall within the established clear-cut range when a supply voltage is switched on. Large dynamic swings occurring during normal operation do not have to be limited. The dynamic swings can easily be measured incrementally by proper processing of an overshoot or undershoot of the measuring range.

Delay times along a signal path (for example through HF filters) are adjusted for, and do not cause errors provided they remain stable after the alignment.

Error recognition is possible if, for example, more than one overshoot or undershoot occurs, or a predetermined excess swing is exceeded. In this case, the second overshoot or undershoot is not considered, so that the correct range is automatically found again.

The described construction and functionality of a sensor according to the invention is particularly advantageous for position sensors, that is linear and angle sensors, high resolution and accuracy are required of these devices, particularly in special critical safety applications in motor vehicles. However, sensors for other applications may be produced pursuant to the design according present invention.

Thus the invention being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A position sensor system for a motor vehicle comprising:

a position sensor which generates a varying pulse-width-modulated position-dependent signal that varies as a function of a position to be measured in response to digitized measurement values, wherein an overall measuring range of the position sensor is divided into multiple similar, sequential measuring sub-ranges, wherein in each sub-range the position sensor creates said digitized measurement values indicative of positions to be measured, wherein the position sensor adds a fixed offset value to the digitized measurement values, and then feeds the sum of the digitized measurement values and the fixed offset value to a PWM generator so that said PWM generator converts the sum of the digitized measurement values and fixed offset value to said varying pulse-width-modulated position-dependent signal, such that with the sum of a minimum measurement value and the fixed offset value have a minimal degree of modulation greater than 0%, and the sum of a maximum measurement value and the fixed offset value have a maximum degree of modulation less than 100%; and a receiver for receiving the varying pulse-width-modulated position-dependent signal, said receiver converting the varying pulse-width-modulated-position-dependent signal to the sum of the digitized measurement values and the offset value, said receiver having a non-volatile storage, wherein a standard sensor measurement value determined under standard conditions is stored in the non-volatile storage of the receiver of the position sensor, which standard sensor measurement value is added to the digitized measurement value as an additional offset value for calibrating the position sensor system.

2. The position sensor according to claim 1, wherein the receiver of the varying pulse-width-modulated position-dependent signal also removes the fixed offset value from the measurement value obtained from a demodulated signal.

3. The position sensor according to claim 1, wherein the receiver has a diagnostic interface with said nonvolatile storage being part of said diagnostic interface and, when a predetermined signal is applied to the diagnostic interface, the additional offset value is stored in the nonvolatile nonvolatile storage.

* * * * *